United States Patent
Nguyen et al.

(10) Patent No.: US 7,509,520 B1
(45) Date of Patent: Mar. 24, 2009

(54) NETWORK INTERFACE DEVICE HAVING BYPASS CAPABILITY

(75) Inventors: Truong T. Nguyen, San Jose, CA (US); Atul Dahablania, San Jose, CA (US); Olivier Matthey, Sunnyvale, CA (US); John Gmuender, San Jose, CA (US)

(73) Assignee: SonicWALL, Inc., Sunnyvale, CA (US)

( * ) Notice: Subject to any disclaimer, the term of this patent is extended or adjusted under 35 U.S.C. 154(b) by 476 days.

(21) Appl. No.: 11/370,722

(22) Filed: Mar. 7, 2006

(51) Int. Cl.
G06F 11/00 (2006.01)

(52) U.S. Cl. .......................................... 714/4

(58) Field of Classification Search .............. 714/2–4, 714/8, 18, 25, 43, 56
See application file for complete search history.

(56) References Cited

U.S. PATENT DOCUMENTS

| | | | | |
|---|---|---|---|---|
| 5,498,975 A | * | 3/1996 | Cliff et al. | 326/10 |
| 5,898,837 A | * | 4/1999 | Guttman et al. | 709/224 |
| 6,233,704 B1 | * | 5/2001 | Scott et al. | 714/717 |
| 7,095,756 B2 | * | 8/2006 | Binder | 370/502 |
| 2002/0107962 A1 | * | 8/2002 | Richter et al. | 709/225 |
| 2005/0018618 A1 | | 1/2005 | Mualem et al. | |
| 2005/0081058 A1 | | 4/2005 | Chang et al. | |

OTHER PUBLICATIONS

Trend Micro Network VirusWall 2500 Administrator's Guide, Copyright 2004, www.trendmicro.com/download/documentation/rating.asp. Release date: Oct. 2004, Document Part No. NVEM1199/40803, 224 pages.
Trend Micro Network VirusWall: Outbreak Prevention Appliances that Protect Local Area Networks, Branch Office Networks, and Servers from Network Worm Outbreaks, 4 pages. Copyright 2004.
Unified Threat Management Firewall Appliances, Jul. 12, 2005. 2 pages. http://www.unifiedthreatmanagement.com.

* cited by examiner

*Primary Examiner*—Nadeem Iqbal
(74) *Attorney, Agent, or Firm*—Blakely Sokoloff Taylor & Zafman, LLP

(57) ABSTRACT

A network apparatus uses a processing unit to convey data bidirectionally between ports. A programmable bypass circuit may have normal, fail opened and fail closed modes. Potential failure events that embodiments of the invention can deal with gracefully include power failures. Decisions as to the failure mode(s) to be adopted in the event of failure may be determined based on a programmable policy.

20 Claims, 8 Drawing Sheets

NETWORK INTERFACE DEVICE HAVING BYPASS CAPABILITY

FIELD OF THE INVENTION

The present invention relates generally to the field of network communications. More particularly, this invention relates to a network interface device having programmable bypass capabilities.

BACKGROUND

INDs (Intermediate network devices), such as gateways or network access devices, including Internet gateways, have evolved in complexity in recent years. Their usage is commonplace, they may integrate, for example, high-speed gateway anti-virus, anti spyware, intrusion prevention, content filtering, stateful firewall, IPSec VPN (Internet Protocol Security, Virtual Private Network) and more.

As more features are provided and used so there can grow an increasing reliance on the benefits thereof and a correspondingly growing need to manage and limit the consequences of extraordinary events including signal borne threats and/or device degradations or even complete failures. Various capabilities for threat management, including UTM (unified threat management) exist in previously developed solutions however improvements in reliability, graceful degradation and flexible response modes are needed.

In a communication network, if a connecting device (such as switch/router/UTM (Unified Threat Management) appliances or firewall) fails due to hardware or software malfunction, it could result in terminating the connection between the ingress and egress ports. For an inline device such a malfunction would then stop the flow of the data across the device resulting in network down time.

There are old methods of bypassing the devices manually, or always asserting bypass, on system failures. Such "bypass-always" devices allow a complete bypass always (on failure) and may have no mechanism to inhibit this bypass based on system configuration and application. These implementations may not allow the choice of selecting whether to bypass or not to bypass based on the system application either at all, or not in a sufficiently adequate manner.

Utilizing a "manual-bypass" method may result in experiencing network downtime and/or may require an IT (Information Technology) person to find a failing device and then bypass it manually. This may be very time consuming and costly.

Utilizing an "automatically bypass-always" method for UTM appliances may result in experiencing undesired network connectivity in cases where system applications do not want to allow data flow-through whenever a system fails. Such a case is commonplace in security and firewall applications.

FIG. 1 is an illustration of part of a network configuration. Internet (internetwork) 101 is connected by some form of telecommunications link 102 to a network access device 110. The network access device 110 may operate as a gateway to provide internetwork (external network and/or Internet) access to devices (not shown) that may be connected to a LAN 120 (local area network). Typically, the network access device 110 may perform gateway algorithms to enable it to operate as a firewall, router, virus detector, and/or provide numerous other services.

FIG. 2 is an illustration of part of a network configuration, such as that of FIG. 1 under a possible failure condition that may be viewed as a "fail closed" condition. Failures can occur in many ways, often not entirely capable of being anticipated, like the destruction of an electronic circuit, loss of electrical power, or undesired software behavior.

In the system of FIG. 2, failure has resulted in a "No Connection" condition between the LAN 120 and Internet 101. This type of failure is commonly termed "fail closed" as no data traffic is allowed to flow through the network access device 110 anymore. Unless a fallback network access device (not shown) exists and offers an alternate route for such data flow, service is effectively disrupted pending remedial action by personnel and/or equipment repair or replacement etc.

FIG. 3 is an illustration of part of a network configuration, such as that of FIG. 1 under a possible alternative failure condition that may be viewed as a "fail open" condition. In this case the network access device 110 has failed in a way network access device 110 no longer provides enhanced services and data passes freely, without filtering, virus checking or whatever services network access device 110 might be intended to provide when fully operational. In some embodiments network access device 110 may behave in this failure mode as an IEEE-802.3 "hub" device. This type of failure is commonly termed a "fail opened" (or "fail open") failure suggesting that the interconnection is opened up for any and all data flow to pass unimpeded. Unimpeded data flow can have various consequences, for example there may be a failure to block undesirable software viruses and data flow that should be confined to the LAN is allowed to leak upstream thus providing needless and unproductive data flow loading to upstream network devices.

It is a limitation, commonly found in previously developed solutions that a choice between the failure modes of FIG. 2 and FIG. 3, where available at all, must be made long in advance, such as when the network access device is placed into service rather than in a programmable manner, responsive to varying system configuration.

Additionally, in previously developed solutions, many devices are not capable of "fail open" behavior when unpowered such as when failure is due to power supply malfunction. This can result in inconsistent behavior improperly responsive to the (sometimes unpredictable) precise nature of each failure.

SUMMARY

Embodiments of this invention may include a network apparatus that uses a processing unit to convey data bidirectionally between ports. Included may be a programmable bypass circuit having normal, "fail open" and "fail close" modes. The potential failure events that embodiments of the invention can deal with include power failures. The decision as to the failure mode(s) to be adopted in the event of failure may be determined based on a programmable policy.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

In the drawings.

DETAILED DESCRIPTION

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1:
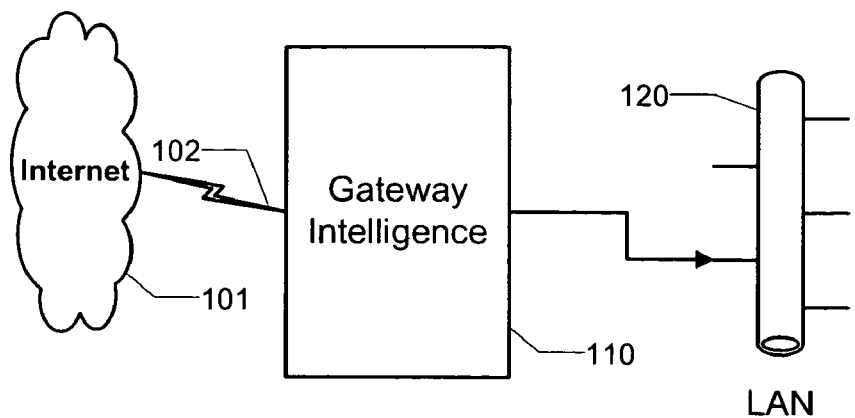
FIG. 1 is an illustration of part of a network configuration.
Figure 2:
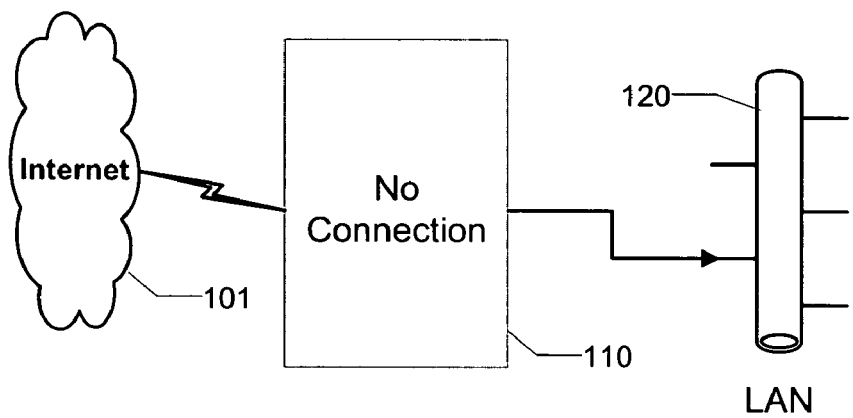
FIG. 2 is an illustration of part of a network configuration, such as that of FIG. 1 under a possible failure condition that may be viewed as a "fail closed" condition.
Figure 3:
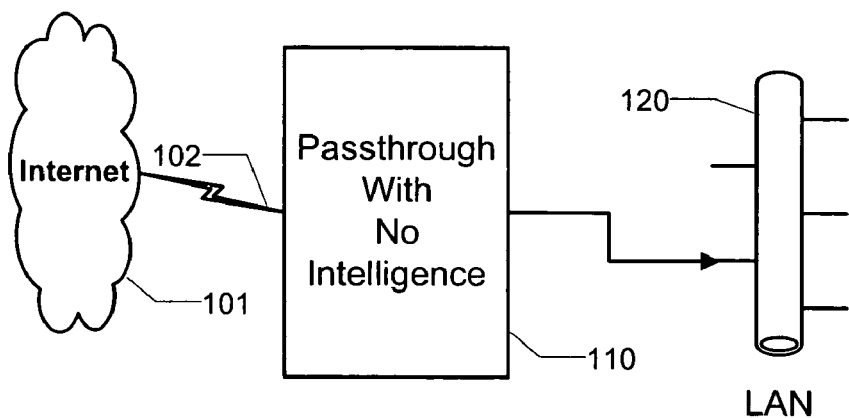
FIG. 3 is an illustration of part of a network configuration, such as that of FIG. 1 under a possible alternative failure condition that may be viewed as a "fail opened" condition.
Figure 4A:
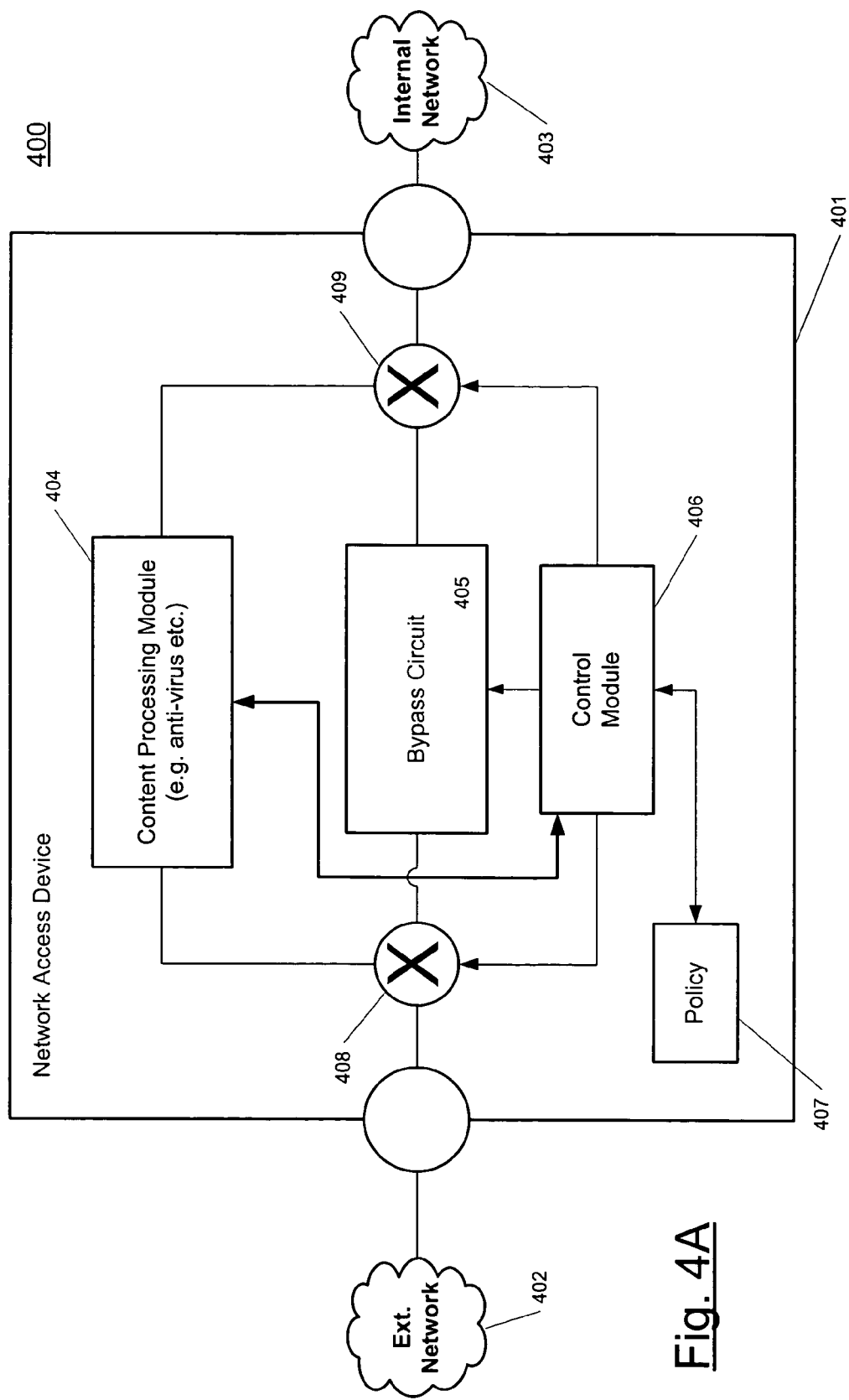
FIG. 4A is a block diagram illustrating an example of a network configuration according to one embodiment of the invention.

FIG. 4A is a block diagram illustrating an example of a network configuration according to one embodiment of the invention. Referring to FIG. 4A, the network configuration example 400 includes, but is not limited to, a network access device 401 for interfacing an external network 402 and an internal network 403. In one embodiment, the network access device 401 includes a control module 406 for controlling a content processing module 404 and a network bypass circuit 405 based on a programmable policy 407. Note that any of the modules 404-406 may be implemented in software, hardware, and a combination of both.

The content processes performed by content processing module 404 may include, for example, at least one of anti-spyware, firewall, content filtering, intrusion detection and prevention, and/or IPSec VPNs (Virtual Private Networks), etc. functionality. In one embodiment, if a failure of the content processing module 404 (e.g., software, hardware, or both) occurs, the control module 406 may control the switches or relays 408 and 409 to either isolate data traveling between the external network 402 and the internal network 403 from the content processing module 404 based on the settings of policy 407. According to another embodiment, the control module 406 may redirect the data through the bypass circuit 405 between the internal network 403 and the external network 402 based on the policy 407. Note that throughout this application, a gateway device is used as a network access device for the purposes of illustration. However, it is not so limited, other types of the network access devices may be utilized.

Figure 4B:
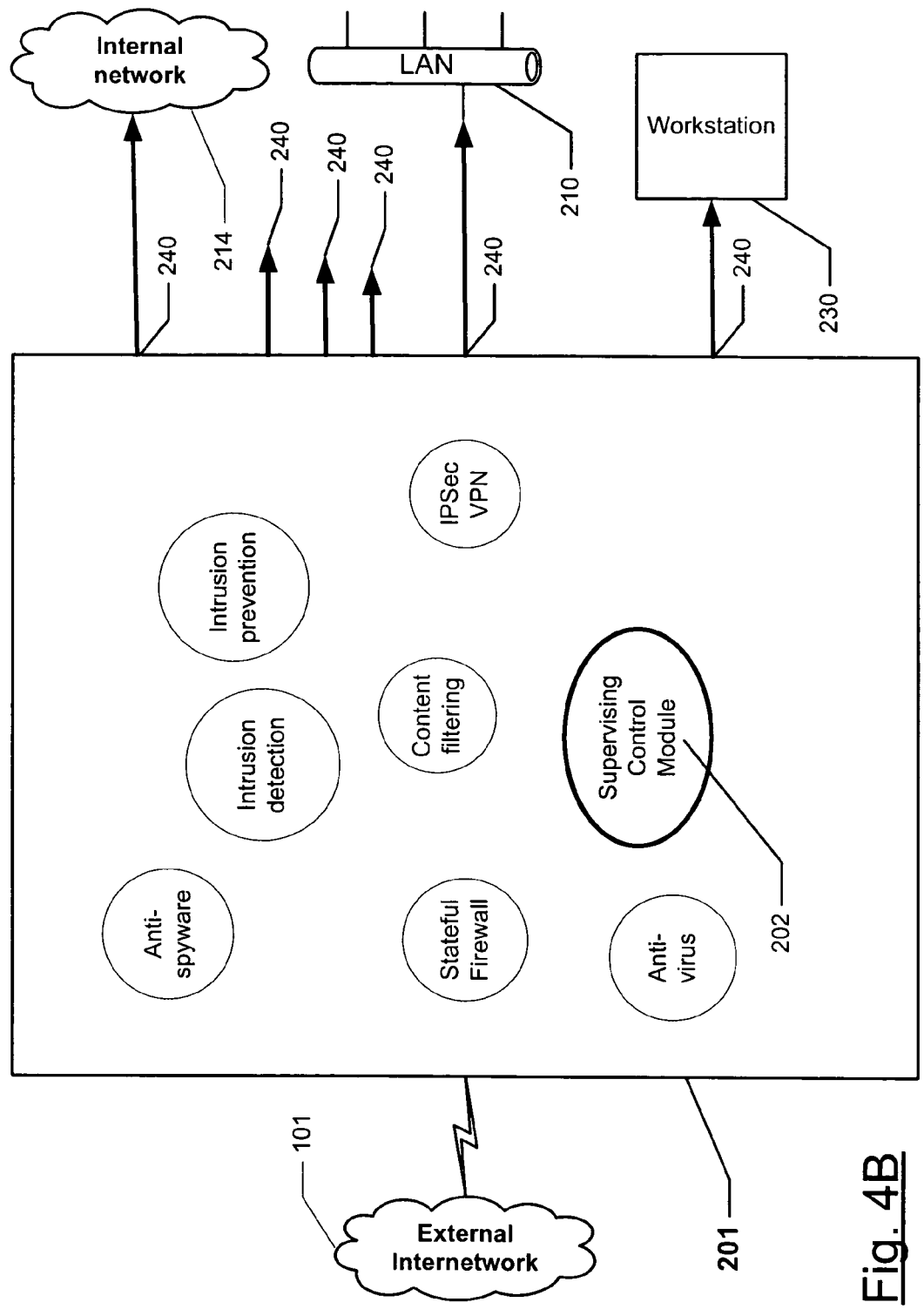
FIG. 4B is a block diagram illustrating an example of a network configuration according to an alternative embodiment of the invention.

FIG. 4B is a block diagram illustrating an example of a network configuration according to an alternative embodiment of the invention. In one embodiment, gateway device 201 couples an "external" internetwork 101 and has multiple Input-Output ports or interfaces 240 that may couple LAN (local area network) segments 210 and individual workstations 230 and more extensive "internal" networks 214. Gateway device 201 as indicated may have one or more control module(s) that are organized as functional modules, for example, including at least one of Anti-Spyware modules, Firewall modules, Content Filtering modules, Intrusion detection and prevention modules, IPSec VPNs (Virtual Private Networks) and more. Typically these functions will including a supervising controlling module 202 and may performed by some kind of programmable digital controlling circuit or circuits such as one or more CPU (Computer Central Processor Unit), MCU (Micro-controller Unit) or ASIC (Application Specific Integrated Circuit, such as may be created using programmable semi-custom parts). Alternatively, these functions may be performed by software and/or a combination of software and hardware.

The controlling circuit(s) used to embody control module functions are not shown in FIG. 4B but their presence may be implied. Additionally, in embodiments of the invention the control algorithms may be embodied in various ways including but not limited to, for example, sequenced "random" logic, microcode, firmware and/or software that may be recorded onto a machine readable medium, held in digital memories or transmitted as a modulated waveform.

In some embodiments of the invention gateway devices may be configured for fail closed thus allowing "parallel" gateway(s) to take over connectivity to external networks. In some embodiments of the invention gateway devices configured for fail opened allowing for loss of functionality while still providing connectivity between external and internal networks.

Figure 5:
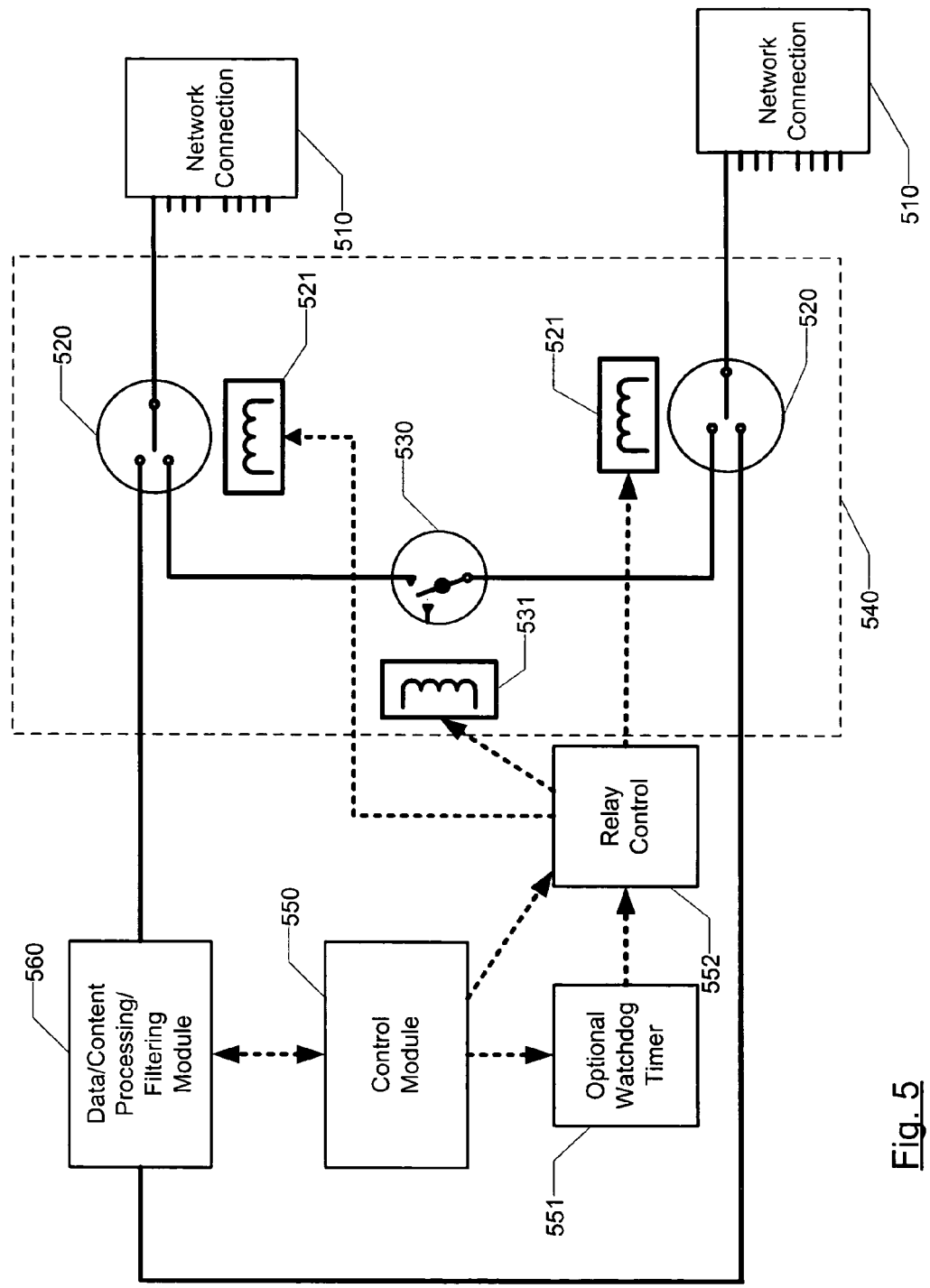
FIG. 5 shows, in partial block diagram form, a schematic of part of a network access device according to an embodiment of the invention.

FIG. 5 shows a schematic diagram of a network interface device according to an embodiment of the invention. In this exemplary embodiment, first and second Network ports 510 may, for example, be of an 8-conductor or 4-conductor modular connector type loosely termed "RJ-45" and commonly used with copper (as contrasted with wireless or fiber channel) "Ethernet" LANs (local area networks). However, although RJ-45 network connectors are utilized through this application, other types of network connectors (such as Fiber/Optical interfaces) may also be utilized.

Still referring to FIG. 5, a Data/Content Processing/Filtering Module or processing unit 560 connects network ports 510 for conveying data between them and via programmable bypass circuit 540. Memory will typically be included within processing unit 560 as an intermediate storage for the data being conveyed, however memory could otherwise be provided in a functionally equivalent manner or place, such as in FIFOs (First-In/First-Out memory queuing devices). It will be appreciated that the drawing shows just a single conductor for bypass circuit 540, and substantially identical or similar circuits will typically be provided for many or all conductors (typically four UTPs (Unshielded, twisted conducting pairs) as may be present on an RJ-45 style connector). In some cases however, activation coils 521, 531 may be shared between two (or perhaps more) bypass conductors such as may be switched in unison. A control module 550 (CPU, MCU or etc.) provides gateway features to supervise the action of processing unit 560, optional watchdog timer 551, and relay control 552. It will be appreciated that the relay configurations above are described by way of illustration, not by way of limitation. Other configurations of relays, or other parts with comparably equivalent functions, may be utilized.

Processing unit 560 may be used for various purposes including network data to and from network ports and for maintaining tables of data relating to application functions as described above in connection with FIG. 4. Router processing units may typically take various forms and may be configured in levels such as to achieve performance criteria. Also, the functions of control module 550 may be distributed among more than one technology for example conventional CMOS microcontrollers and ASIC microcoded data engines.

Watchdog timers are well-known in the art and may be embodied in various alternative ways, for example as periodically reset one-shots that can trip hardware interrupts.

Bypass circuit 540 is generally controlled by a relay control 552 which is in turn controlled by procedural algorithms in control module 550. In this particular embodiment, bypass circuit 540 includes a latching relay 530 together with an associated activation coil 531. Static relay contacts 520 (such as may typically be embodied using spring-loaded relays) with associated activation coils 521 having control terminals are also present.

Under conditions of power failure (or other no-power conditions, such as power supply device malfunction) latching relay contacts 530 act as current conducting terminals to maintain their most recently set position unchanged. In contrast, under conditions of power failure, static relays (520, 521) move automatically to take up a predetermined state which couple the conductors of the network ports to the latching relay 530 and electrically isolate them from the processing unit 560.

Thus, it can be seen that there are at least three modes of operation. In a first (normal operation) mode, the network ports 520 are connected to the processing unit 560; and data is conveyed between the network ports 520 through the processing unit 560 under the control of the control module 550.

In a second mode, the network ports 510 are all electrically connected together via the latching relay 530. This second mode is, or is similar to, a fail open condition. In some configurations a subset of conductors may be so connected and/or some conductors may be cross-connected (e.g. receive cross-connected to transmit and vice-versa) such as for circuit topological reasons.

And in a third mode, network ports 510 are disconnected from the processing unit 560 are and also electrically isolated from each other by means of a latching relay 530 remaining set to an open circuit condition. This third mode can thus be a fail close mode, and such is especially apparent and appropriate if a further (fallback) network access device is configured in parallel.

It will be apparent that, in embodiments of the invention, the decision as to whether the system should fail closed or fail opened can be made, in advance of failure, by the gateway control module according to criteria set up by a system administrator. Such criteria may be interpreted dynamically in response to prevailing network conditions such as intruder alerts. This contrasts with previously developed solutions in which the decision between fail closed and fail opened cannot be made dynamically and responsively to complex variable criteria, but more typically must be made at time of device installation.

Configuring of the policy for determining failure modality may be made by an administrator (or other responsible person or other authority) in any of various ways. For example, the gateway device may include computer programs that respond to configuration parameters entered through a CLI (command-line interface) or the gateway device may act as an HTTP (hypertext transfer protocol) web server and provide a GUI (graphical user interface), also referred to as a Web interface, to an administrator. Various other refinements will be apparent. For example, the pre programming of failure mode may be made responsive to network conditions by control module algorithms and may be revised from time to time dynamically. For example, the programmed failure mode might be changed from fail opened to fail closed in response to detection of an attempt to breach security and compromise the node and the consequent raising of an intruder alert.

Figure 6:
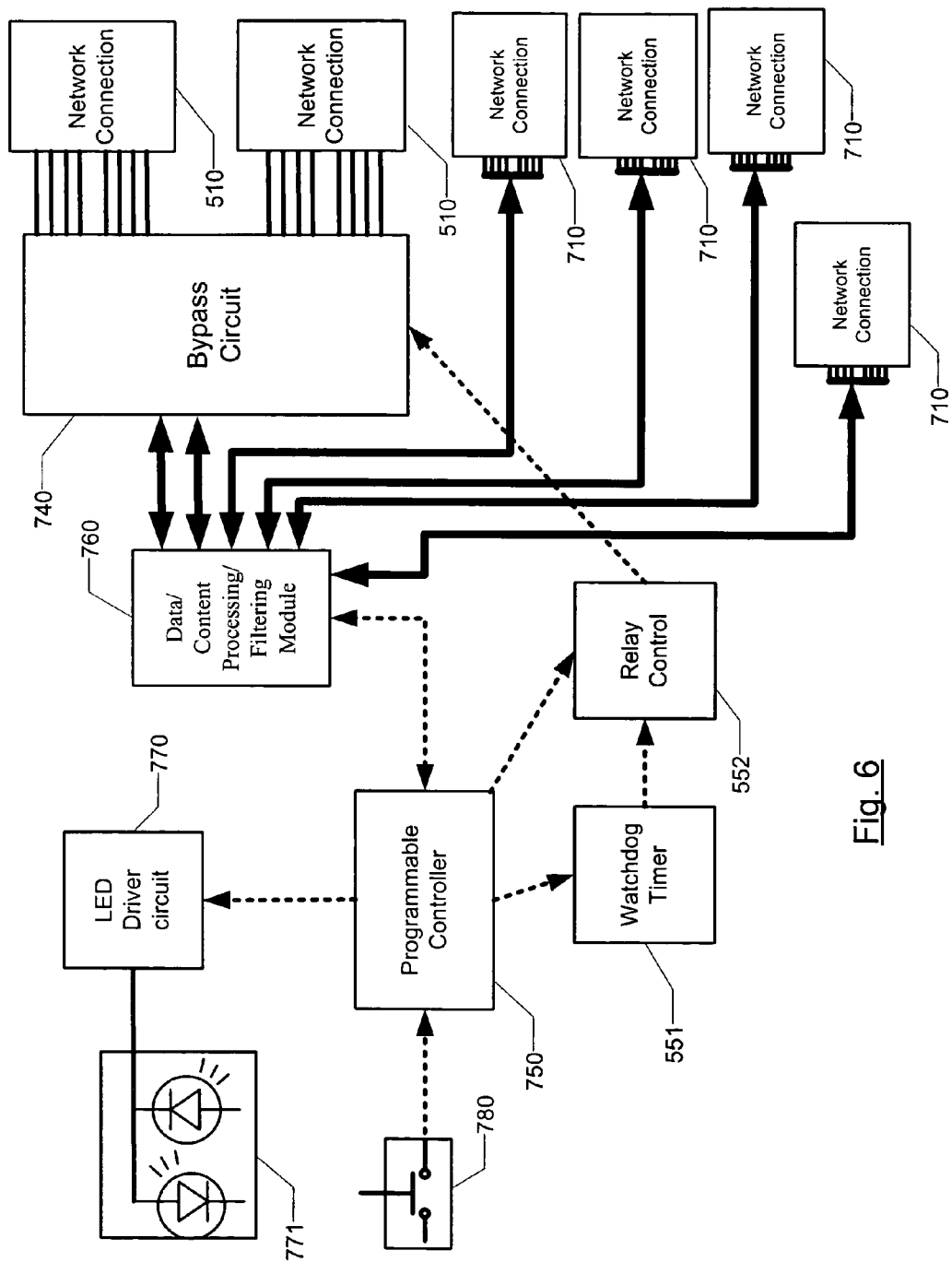
FIG. 6 shows a gateway device with other various features including multiple network ports.

FIG. 6 shows a gateway device with other various features such as multiple network connection ports 510 and 710, a bypass override switch 780 together with a multi-mode indicator LED 771 (e.g., Light emitting diode) with driver circuit 770. Typically the gateway device may have multiple network ports, only some of which 510 are equipped with bypass circuits. Other network ports 710 are not equipped with bypass circuit 740. This may provide a trade-off between considerable functional capability and cost. In a practical application there might be many more network ports than the six shown in FIG. 6.

The programmable controller 750 with processing unit 760 may direct the flow of network data (e.g. packets) through the system. The programmable controller 750 may also control optional watchdog timer circuit 551 and relay control 552. The relay control circuit 552 may, in a conventional manner, drive the control terminals of the relays (for example the control terminals of the relay activation coils 531, 520, 521 of FIG. 5). The bypass override switch 780 may provide a further means for directing the operation of the programmable controller 750, in particular it may be used as a "manual" operation to bypass the network device if it suspected (pending investigation) of malfunction or of being a source of network congestion.

Purely for example, it may be detected that the network is slowed by excessive traffic (data flow) and a content filter alert is also detected. The system administrator might decide that the coincidence of these two events is not random and the network may be restored to full speed, but without content filtering while the source of the content filtering alert is tracked down and remedied. Once the offending activity is quashed the switch may be used a second time to return the gateway device to normal operation.

Figure 7A:
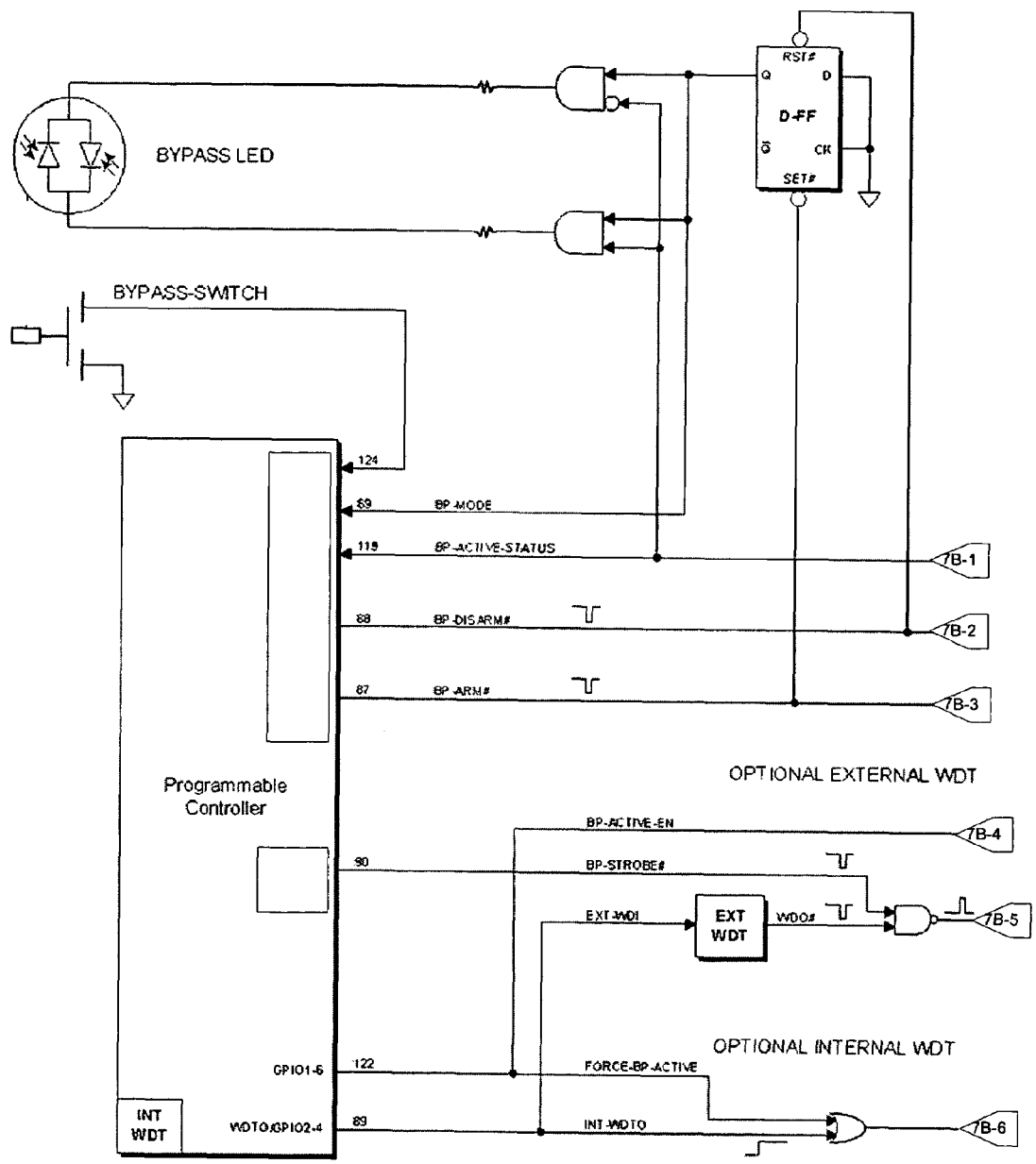
FIGS. 7A and 7B, taken together, show, in partial block diagram form and in enhanced detail, a schematic of a network access device according to an embodiment of the invention.
Figure 7B:
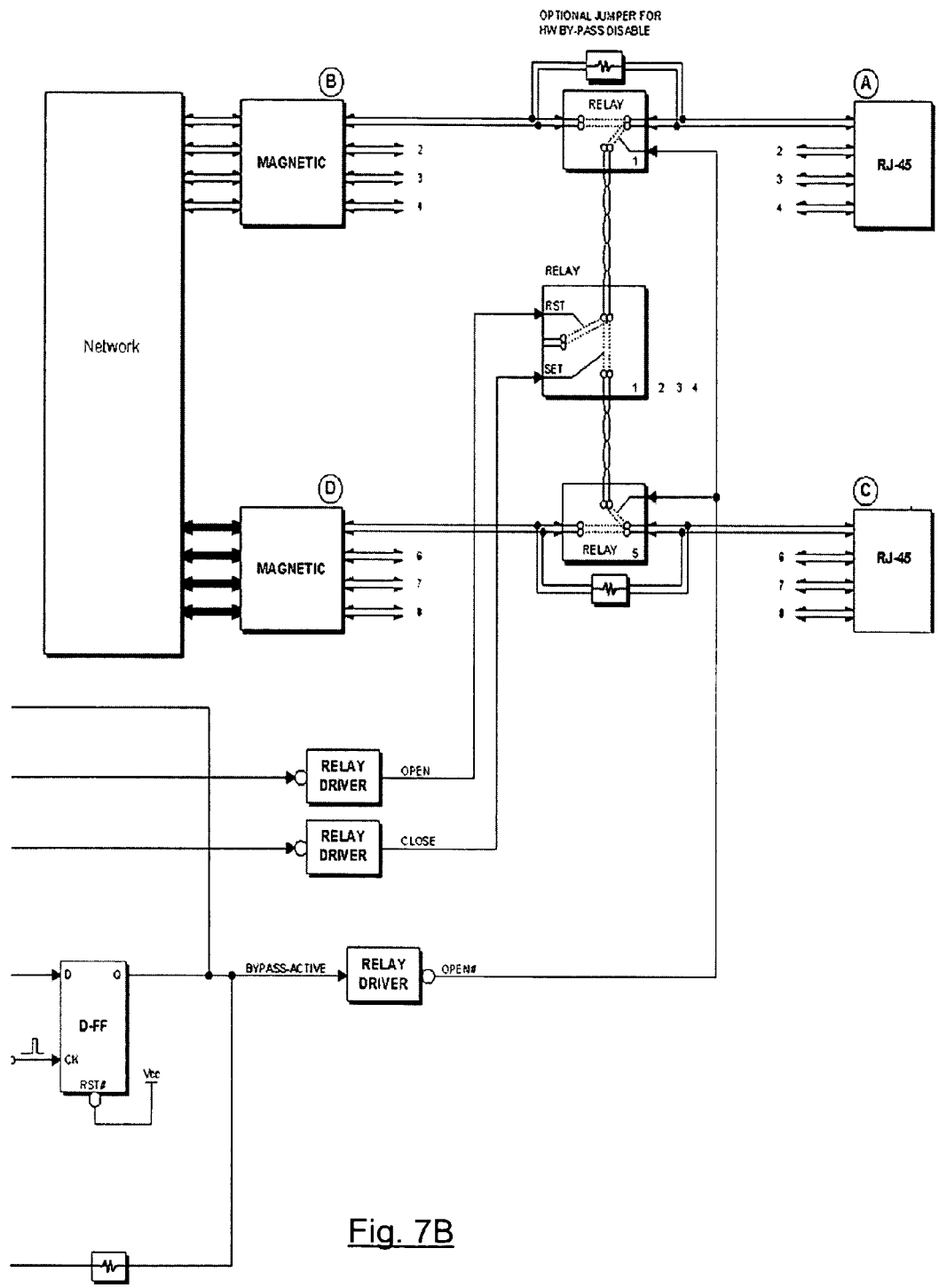

FIGS. 7A and 7B, taken together, show a schematic of a network access device according to an embodiment of the invention. As a further example of functional capability, such as may be incorporated into the network devices of FIGS. 7A and 7B, the control module may be programmed to set up a fail closed mode if it is determined that a redundant network access device is functional but to fail opened if it is known that the companion network access device is nonfunctional or does not exist in the Network Implementation. To this end provision may be made, such as in the arrangement shown, for accommodating an external watchdog timer signal and/or a manually operated bypass control switch.

FIGS. 7A and 7B show a number of implementation details of a particular exemplary embodiment of the invention. For example a programmable controller with an internal watchdog drives a number of external status lines including INT-WDT0 which is a level trigger watchdog signal together with FORCE-BP-ACTIVE which gates the internal watchdog signal as shown. Also shown are small scale integration parts, such as gates and a flip-flop to control the indicator LED (light emitting diode) BYPASS_LED, and a momentary contact bypass override switch BYPASS-SWITCH. The relay current drivers are shown "RELAY DRIVER" together with a conventional clocked D-type in the BYPASS_ACTIVE circuit. Magnetic chokes (B) and (D) are shown for bidirectional data transfer between the processing unit and the Network connection ports (A) and (C) respectively.

As depicted, the static relays may be disabled by use of optional jumpers if it is decided (presumably for security reasons) to prevent the network device from ever entering a fail opened mode, such inhibition might be desirable, for example, during systems maintenance for a security audit.

Still referring to FIGS. 7A and 7B, as shown, the relays are embodied as multiple two-pole devices and a single signal OPEN# activates both (or all) static relays in unison. The latching relay is also a two-pole device, in this exemplary embodiment, and is controlled by separate RST (reset) and SET signals, labeled OPEN and CLOSE respectively. The RST signal causes the latching relay to be activated so that, in the event of (for example) a hypothetical power failure the network device will fail closed. Conversely the SET signal may be used to force a fail opened upon power failure.

Figure 8:
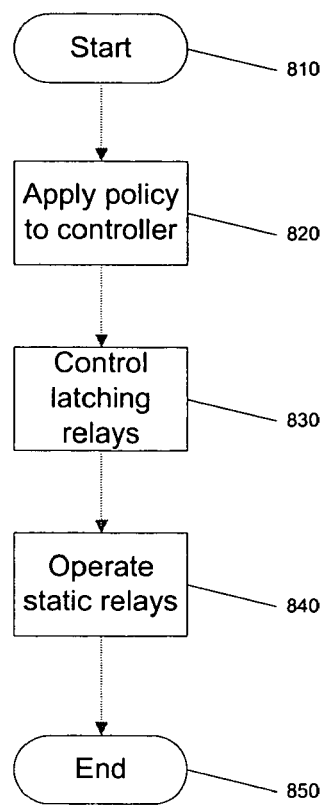
FIG. 8 shows a representation of methodical embodiment of the invention in the form of a flow chart such as may be applied to a network apparatus.

FIG. 8 shows a representation of methodical embodiment of the invention in the form of a flow chart such as may be applied to a network apparatus. In box 810 the method starts. In box 820, a policy is applied to a programmable controller to control failure modes. In box 830, a latching relay having an open mode and a closed mode is controlled, thus the policy may select between which mode to adopt in response to abnormal network operating conditions.

In box 840, first and a second static relays are operated during abnormal network operating conditions to couple network ports to the latching relay. This may provide fail opened or fail closed in conformance with the prior selected policy and failure type. In box 850, the method ends.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, compact disc read-only memories (CD-ROMs), and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A network apparatus comprising:
   a processing unit to convey data bidirectionally between first and second network ports, wherein the first and second network ports are respectively coupled to external and internal networks; and
   a programmable bypass circuit, coupled between the processing unit and the first and second network ports, having normal, fail opened and fail closed modes determined based on a programmable policy.

2. The apparatus of claim 1, wherein, in the fail opened mode, the programmable bypass circuit is operable to connect the first and second network ports together and to isolate the first and second network ports from the processing unit.

3. The apparatus of claim 2, wherein:
   the programmable bypass circuit is further operable in the normal mode to connect the first and second network ports to the processing unit and to isolate the first and second network ports from each other.

4. The apparatus of claim 3, wherein:
   the programmable bypass circuit is further operable in the fail closed mode to isolate the first and second network ports from the processing unit and to isolate the first and second network ports from each other.

5. The apparatus of claim 1, wherein:
the first and second network ports each comprises a plurality of signal carrying conductors and
further wherein the bypass circuit is operable in the fail opened mode to electrically couple the signal carrying conductors of the first network port to respective signal carrying conductors of the second network port and
operable in the normal and fail closed modes to electrically isolate the plurality of signal carrying conductors from each other.

6. The apparatus of claim 5, wherein:
the first and second network ports conform to an IEEE-802.3 circuit with 8 or 4 conductors.

7. The apparatus of claim 5, wherein:
the programmable bypass circuit is operable to automatically leave the normal mode responsive to a power failure.

8. The apparatus of claim 1, further comprising:
a control module operable to:
   direct the conveyance of the data through the processing unit to and from the first and second network ports, and
   program the programmable bypass circuit to select one of the fail opened and fail closed modes as a failure mode based on the programmable policy, wherein the apparatus is operable to automatically adopt the selected failure mode dependent upon a predetermined failure condition.

9. The apparatus of claim 8, wherein:
a predetermined failure condition is selected from a list consisting of a power failure and a power supply failure.

10. The apparatus of claim 5, further comprising:
a control module operable to:
   direct the conveyance of the data through the processing unit to and from the first and second network ports, and
   program the programmable bypass circuit to select one of the fail opened and fail closed modes as a failure mode based on the programmable policy, wherein the apparatus is operable to automatically adopt the selected failure mode dependent upon a predetermined failure condition.

11. A network apparatus comprising:
first and second network ports;
a processing unit;
a latching relay having first and second current conducting terminals;
   first and second non-latching relays each coupled to the first and second network ports respectively, first and second current conducting terminals respectively, and the processing unit; and
a controlling circuit coupled through at least one relay control circuit to the control terminals of the latching and non-latching relays according to a programmable policy to select between a fail opened, a fail closed and a normal modes.

12. The network apparatus of claim 11 wherein:
the first and second non-latching relays to couple the network ports to the processing unit whenever the non-latching relays are energized and couple the network ports to the latching relay current terminals whenever the non-latching relays are not energized.

13. The apparatus of claim 11 wherein:
the controlling circuit is further coupled to the processing unit.

14. The apparatus of claim 11 further comprising:
a plurality of third network ports coupled to the processing unit and not coupled to the latching and the first and second non-latching relays.

15. A method for operating a network apparatus comprising:
applying a policy to a programmable controller to control a latching relay having an open mode and a closed mode to select between adopting the open mode and adopting the closed mode responsive to abnormal network operating conditions; and
operating a first and a second static relay to couple a first network port and a second network port to the latching relay during abnormal network operating conditions,
wherein during abnormal operating conditions, the latching relay is in the open mode to cause the network apparatus to fail closed and the latching relay is in the closed mode to cause the network apparatus to fail opened based on the policy.

16. The method of claim 15 wherein:
the abnormal operating conditions comprise a power failure or power supply failure.

17. The method of claim 15 wherein:
the applying further directs the programmable controller to act as a gateway for data flow between the first network port and the second network port.

18. The method of claim 15 wherein:
the first network port is coupled to an internal network and the second network port is coupled to an external network.

19. A network access device for interfacing a first network and a second network, comprising:
a content processing module for processing content of network data flow traveling between the first and second networks;
a bypass circuit coupled between the content processing module and the first and second networks, wherein the first and second networks are respectively external and internal networks;
a memory to store a programmable policy; and
a control module, coupled to the bypass circuit, to selectively isolate the first and second networks or causes the network data flow to be routed between the first and second networks bypassing the content processing module, wherein the selection is responsive to a failure and is based on the programmable policy stored in the memory.

20. The network access device of claim 19 wherein:
the control module is further coupled to the processing unit.

* * * * *

UNITED STATES PATENT AND TRADEMARK OFFICE
CERTIFICATE OF CORRECTION

PATENT NO. : 7,509,520 B1  Page 1 of 1
APPLICATION NO. : 11/370722
DATED : March 24, 2009
INVENTOR(S) : Nguyen et al.

It is certified that error appears in the above-identified patent and that said Letters Patent is hereby corrected as shown below:

Title page, item
(75) Inventors:   delete "Dahablania" and insert --Dhablania--.

Signed and Sealed this

Fifth Day of May, 2009

JOHN DOLL
*Acting Director of the United States Patent and Trademark Office*